US012326712B2

(12) United States Patent
Sekimoto

(10) Patent No.: US 12,326,712 B2
(45) Date of Patent: Jun. 10, 2025

(54) CONTROL SYSTEM

(71) Applicant: FANUC CORPORATION, Yamanashi (JP)

(72) Inventor: Kouji Sekimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 379 days.

(21) Appl. No.: 17/760,003

(22) PCT Filed: Feb. 1, 2021

(86) PCT No.: PCT/JP2021/003493
§ 371 (c)(1),
(2) Date: Aug. 3, 2022

(87) PCT Pub. No.: WO2021/157513
PCT Pub. Date: Aug. 12, 2021

(65) Prior Publication Data
US 2023/0065450 A1    Mar. 2, 2023

(30) Foreign Application Priority Data

Feb. 4, 2020   (JP) .................................. 2020-017185

(51) Int. Cl.
G05B 19/414    (2006.01)
G06F 3/147     (2006.01)
(Continued)

(52) U.S. Cl.
CPC ........... G05B 19/414 (2013.01); G06F 3/147 (2013.01); H04L 67/10 (2013.01); H04L 67/12 (2013.01);
(Continued)

(58) Field of Classification Search
CPC .......... G05B 19/414; G05B 2219/1194–1214; G06F 3/147
(Continued)

(56) References Cited

U.S. PATENT DOCUMENTS 5,828,421 A * 10/1998 Boyce .................. H04N 19/122
375/E7.184
6,640,140 B1   10/2003 Lindner et al.
(Continued)

FOREIGN PATENT DOCUMENTS

JP    H6111092 A    4/1994
JP    H11-024716 A  1/1999
(Continued)

OTHER PUBLICATIONS

International Search Report in PCT/JP2021/003493, mailed Apr. 13, 2021. 3pp.

Primary Examiner — Wing F Chan
Assistant Examiner — Leon Y Tseng
(74) Attorney, Agent, or Firm — HAUPTMAN HAM, LLP

(57) ABSTRACT

A control system is configured by two-way communication conducted between a controller and a display terminal for displaying an operating state of the controller, and includes a processing time managing unit configured to measure time taken for processing pieces of data received from another end, and obtain from the other end and manage time taken on the other end for processing the pieces of data sent to the other end, and a congestion control unit configured to adjust a data sending amount to the other end per unit time based on the time taken for processing the pieces of data on the other end which are managed by the processing time managing unit.

8 Claims, 4 Drawing Sheets

(51) Int. Cl.
*H04L 67/10* (2022.01)
*H04L 67/12* (2022.01)

(52) U.S. Cl.
CPC ................. *G05B 2219/1194* (2013.01); *G05B 2219/1214* (2013.01)

(58) Field of Classification Search
USPC ........................................................ 709/235
See application file for complete search history.

(56) References Cited

U.S. PATENT DOCUMENTS

| | | | |
|---|---|---|---|
| 2001/0003804 A1 | 6/2001 | Papadopoulos et al. | |
| 2011/0051934 A1* | 3/2011 | Ikeda | H04L 25/05 380/287 |
| 2014/0185444 A1 | 7/2014 | Inoue et al. | |
| 2014/0189105 A1 | 7/2014 | Takenaka et al. | |
| 2015/0054839 A1* | 2/2015 | Aoyama | G06F 13/4282 345/520 |
| 2017/0185055 A1* | 6/2017 | Nakajima | G05B 13/022 |
| 2018/0335979 A1* | 11/2018 | Kim | G06F 3/0656 |
| 2020/0081656 A1* | 3/2020 | Park | G06F 3/0673 |

FOREIGN PATENT DOCUMENTS

| | | | |
|---|---|---|---|
| JP | 2001144802 A | | 5/2001 |
| JP | 2004511845 A | | 4/2004 |
| JP | 2004516540 A | | 6/2004 |
| JP | 2007-201702 A | | 8/2007 |
| JP | 2008042384 A | * | 2/2008 |
| JP | 2009147795 A | | 7/2009 |
| JP | 2014127969 A | | 7/2014 |
| JP | 2014131093 A | | 7/2014 |
| JP | 201845681 A | | 3/2018 |

* cited by examiner

CONTROL SYSTEM

RELATED APPLICATIONS

The present application is a National Phase of International Application No. PCT/JP2021/003493 filed Feb. 1, 2021, which claims priority to Japanese Patent Application No. 2020-017185, filed Feb. 4, 2020.

TECHNICAL FIELD

The present invention relates to a control system, in particular to a control system having an optimal congestion control function in two-way communication performed specifically in a manufacturing site.

BACKGROUND ART

In a manufacturing site where an industrial machine, such as a machine tool and similar, is installed, the industrial machine is connected to a network to send and receive data via the network. For example, a display terminal used in managing an operation of the industrial machine sequentially obtains an alert state, a shaft position, load information and others from the industrial machine to thereby display them on a screen. An operator can manage whether or not the industrial machine is normally operating while watching a screen display of the display terminal (see e.g. Patent Literature 1).

When communication is established between the industrial machine and another computer, a two-way communication protocol such as WebSocket is applied. The WebSocket enables to actualize the two-way communication in the transmission control protocol (TCP) at low cost. The TCP has structures of congestion control and Slow Start that exchanges packets so as not to exceed the capacity of a receiving buffer on a receiving end.

PRIOR ART DOCUMENT

Patent Literature

[Patent Literature 1] Japanese Patent Laid-Open Publication No. 2018-45681

SUMMARY OF THE INVENTION

Problems to be Solved by the Invention

Two-way communication allows a sending side to keep sending data to a receiving side. Consequently, when the sending side keeps sending data at a rate greater than a data processing speed on the receiving side, successive data are accumulated more and more before the processing of the data currently received on the receiving side is completed. That may cause congestion.

In general, because TCP congestion control is conducted when packets are not normally delivered, a data sending amount and others cannot be limited when the packets are normally delivered. Thus, when the packets are delivered to the receiving side but data processing cannot keep up as described above, the TCP congestion control cannot be applied.

For example, there may be a case where coordinate values of a tool or others in an industrial machine on the sending side are sent to a display terminal on the receiving side to display an image of the industrial machine on the display terminal in order to manage a position of the tool. In this case, if the display terminal cannot keep up generation processing of display images based on pieces of data received on the receiving side and thus congestion occurs when the industrial machine on the sending side keeps sending the coordinate values of the tools or others to the display terminal on the receiving side, an actual position of the tool will differ from a position of the tool displayed on the display terminal. If the position of the tool is displayed differently from the actual position of the tool, it is very dangerous because an operator watching the display terminal may carry out an operation improperly based on the different displayed position.

There is a demand for a technology that enables congestion control in consideration of a data processing status and others in the two-way communication.

Means for Solving the Problem

An aspect of the present invention is a control system configured by two-way communication conducted between a controller and a display terminal for displaying an operating state of the controller, that includes a processing time managing unit configured to measure time taken for processing pieces of data received from another end, and obtains from the other end and manage time taken on the other end for processing the pieces of data sent to the other end, and a congestion control unit configured to adjust a data sending amount to the other end per unit time based on the time taken for processing the pieces of data on the other end which are managed by the processing time managing unit.

Another aspect of the present invention is a controller performing two-way communication with a display terminal, in which the display terminal is configured to display an operating state of the controller, and the controller includes a processing time managing unit configured to measure time taken for processing pieces of data received from the display terminal, and obtains from the display terminal and manage time taken in the display terminal for processing the pieces of data sent to the display terminal, and a congestion control unit configured to adjust a data sending amount to the display terminal per unit time based on the time taken for processing the pieces of data on the other end which are managed by the processing time managing unit.

One aspect of the present invention enables a data sending side to perform congestion control suitable for the current data processing state in the two-way communication by taking into consideration the time taken for processing data on a data receiving side.

BEST MODE FOR IMPLEMENTING THE INVENTION

Illustrative embodiments of the present invention will now be described with reference to the accompanying drawings.

Figure 1:
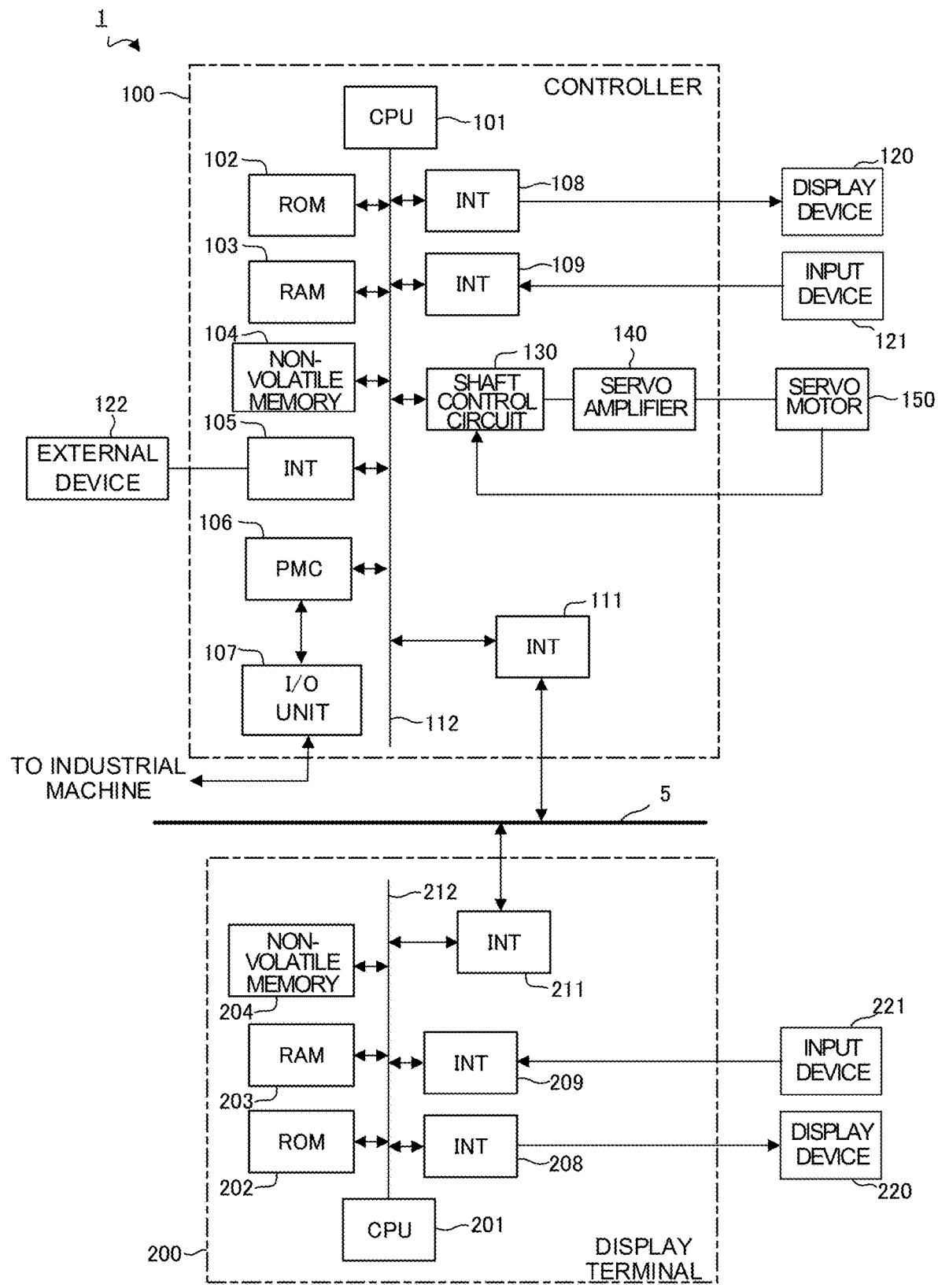
FIG. 1 is a schematic hardware configuration diagram showing a control system according to an embodiment.

FIG. 1 is a schematic hardware configuration diagram showing a main part of a control system according to an embodiment of the present invention. In the invention a control system 1 is configured in such a way that a controller 100 for controlling an industrial machine and a display terminal 200 for displaying information obtained from the controller 100 are connected via a wired or wireless network 5 to each other. The industrial machine controlled by the controller 100 may be a machine for processing a workpiece, e.g., machine tool, injection molding machine, electric discharge machine and others, or may be a robot, carrier machine and others. The display terminal 200 may be for displaying information sent from one controller 100, or may be a fog computing system, host computer, manufacturing monitoring system and equivalent, for instance, that receives pieces of information from a plurality of controllers 100 and displays the pieces of information, received from the plurality of controllers 100, simultaneously or by switching them.

The controller 100 according to the embodiment includes a central processing unit (CPU) 101 that is a processor for controlling the controller 100 as a whole. The CPU 101 is configured to read a system program stored in a read-only memory (ROM) 102 via a bus 112 to thereby control the controller 100 as a whole in accordance with the system program. A random-access memory (RAM) 103 is configured to temporarily store temporary computation data and pieces of data to be displayed, as well as various pieces of data input by an external device.

A non-volatile memory 104 is configured to a memory, solid state drive (SSD) or similar which is, for example, backed up by a battery, not shown. In the non-volatile memory 104, a state of storage of data written therein is retained even when a power source of the controller 100 is turned off. The non-volatile memory 104 is configured to store, for example, pieces of data and a control program read from an external device 122 via an interface 105, pieces of data and a control program input via an input device 121, pieces of data obtained from the industrial machine, pieces of data obtained from the display terminal 200, and pieces of data obtained from a host system, such as fog computing system or cloud server. The pieces of data and programs stored in the non-volatile memory 104 may be deployed into the RAM 103 during executed or used. Furthermore, the ROM 102 is configured to beforehand store various system programs, such as known analysis program.

The interface 105 is for connecting the CPU 101 in the controller 100 to the external device 122, such as USB device. For example, control program and various parameters to be used in controlling the industrial machine can be read from the external device 122. In addition to that, the control program, the various parameters and so on edited in the controller 100 can be stored in external storing means via the external device 122, and can be sent via the network 5 to the display terminal 200 and another computer, such as fog computing system or cloud server.

A programable machine controller (PMC) 106 is configured to output a signal by a sequence program incorporated in the controller 100 to the industrial machine and peripheral devices of the industrial machine (e.g., a tool exchanger, an actuator such as robot, and sensors attached to the industrial machine) via an input/output (I/O) unit 107, so as to control the peripheral devices. The PMC 106 is also configured to receive signals from various switches in an operation board provided to a body of the industrial machine, the peripheral devices and others, conduct necessary signal processing, and then send the signals to the CPU 101.

The pieces of data and so on read in the memory and pieces of data obtained by executing, for example, the control program and the system program are output via an interface 108 and displayed on a display device 120. Furthermore, the input device 121 configured with a keyboard, pointing device and others sends a command in accordance with an operation by an operator via an interface 109, pieces of data and others to the CPU 101.

An interface 111 is for connecting the CPU 101 in the controller 100 to the wired or wireless network 5. To the network 5, the display terminal 200, the fog computing system, the cloud server and others are connected. The controller 100 exchanges data via the network 5 with the display terminal 200, the fog computing system, the cloud server and others.

On the other hand, the display terminal 200 according to the embodiment includes a CPU 201 that is a processor for controlling the display terminal 200 as a whole. The CPU 201 is configured to read a system program stored in a ROM 202 via a bus 212 to control the display terminal 200 as a whole in accordance with the system program. A RAM 203 is configured to temporarily store temporary computing data and pieces of data to be displayed as well as various data input from an external device.

A non-volatile memory 204 is configured with a memory, SSD (solid state drive) or similar which is, for example, backed up by a battery, not shown. In the non-volatile memory 204, a state of storage of data written therein is retained even when a power source of the display terminal 200 is turned off. The non-volatile memory 204 is configured to store, for example, pieces of data input via an input device 221, pieces of data obtained from the controller 100, and pieces of data obtained from a host system, such as fog computing system or cloud server. The pieces of data and programs stored in the non-volatile memory 204 may be deployed into the RAM 203 during executed or used. Furthermore, the ROM 202 is configured to store beforehand various system programs, such as known analysis program.

The pieces of data read in the memory, and pieces of data obtained by executing the system program, etc. are output via an interface 208 and then displayed on a display device 220. Furthermore, the input device 221 is configured with a keyboard, a pointing device and others to send a command in accordance with an operation by an operator and the pieced of data via an interface 209 to the CPU 201.

An interface 211 is for connecting the CPU 201 in the display terminal 200 to the wired or wireless network 5. To the network 5, the controller 100, the fog computing system, the cloud server and others are connected. The display terminal 200 exchanges data via the network 5 with the controller 100, the fog computing system, the cloud server and others.

A shaft control circuit 130 for controlling shafts in the industrial machine is configured to receive an axis movement command amount from the CPU 101 and then output a shaft command to a servo amplifier 140. The servo amplifier 140 is configured to receive the shaft command and then drive a servo motor 150 configured to move the shafts in the industrial machine. The servo motor 150 incorporates a position and speed detector for feeding back a position/speed feedback signal from the position/speed detector to a shaft control circuit 130, so as to perform feedback control on the position and speed. It should be noted that the hardware configuration diagram of FIG. 1 only shows one shaft control circuit 130, one servo amplifier 140, and one servo motor 150, but the number of them will actually be equal to that of the shafts provided in an industrial machine to be controlled. For example, for controlling a common machine tool, three sets of the shaft control circuits 130, the servo amplifiers 140 and the servo motors 150 are provided to move a workpiece toward three linear axes (X-axis, Y-axis and Z-axis) relative to a main shaft to which the tool is attached.

Figure 2:
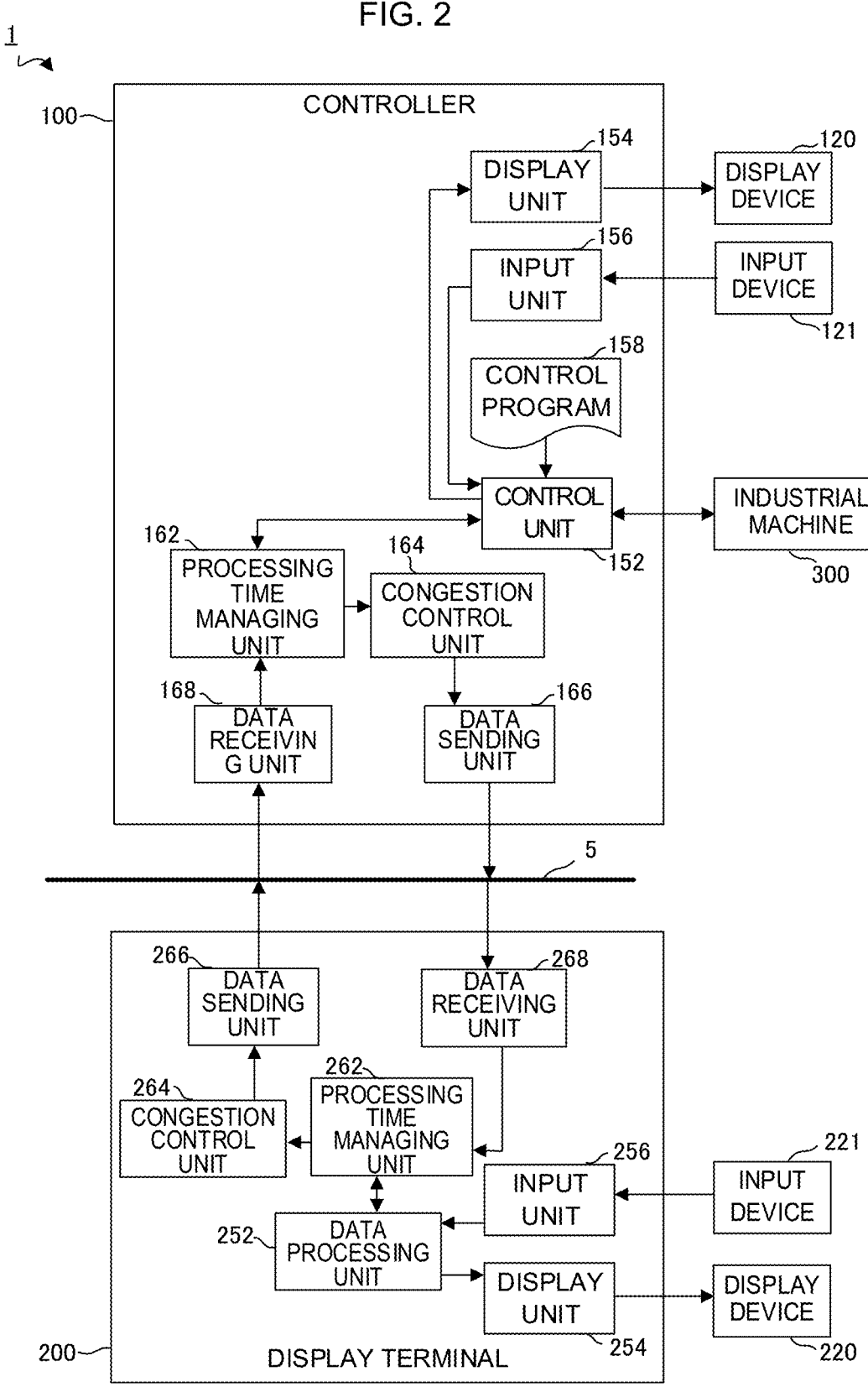
FIG. 2 is a schematic function block diagram showing a control system according to a first embodiment.

FIG. 2 shows in a schematic block diagram functions of the control system 1 according to the first embodiment of the present invention. The functions of the control system 1 according to the embodiment are actualized in such a way that the CPU 101 in the controller 100 constituting the control system 1 and the CPU 201 in the display terminal 200 shown in FIG. 1 execute the respective system programs to control the operations of the respective units in the controller 100 and display terminal 200.

The controller 100 constituting the control system 1 according to the embodiment includes a control unit 152, a display unit 154, an input unit 156, a processing time managing unit 162, a congestion control unit 164, a data sending unit 166, and a data receiving unit 168. Furthermore, the RAM 103 or the non-volatile memory 104 stores beforehand a control program 158 for controlling an operation of an industrial machine 300 driven by the servo motor 150.

The control unit 152 is actualized in such a way that the CPU 101 in the controller 100 shown in FIG. 1 executes the system program read from the ROM 102 to primarily perform computation processing by the CPU 101 with the RAM 103 and the non-volatile memory 104 and controlling of each unit in the industrial machine 300 with the shaft control circuit 130 and the PMC 106. The control unit 152 is configured to analyze blocks of the control program 158, and then control the industrial machine 300 and its peripheral devices based on the analysis result. For instance, in the case where the control program 158 includes a block command to drive each axis of the industrial machine 300, the control unit 152 generates movement command data in response to the block command, and then outputs the produced data to the servo motor 150. In addition to that, if as an example the control program 158 includes a block command to operate a peripheral device attached to the industrial machine 300, such as a carrier machine or a sensor, the control unit 152 generates a predetermined signal for operating the peripheral device and then outputs it to the PMC 16. On the other hand, the control unit 152 obtains, for instance, a position feedback value and a speed feedback value of the servo motor 150, and information on a load measured by a sensor or equivalent.

The display unit 154 and the input unit 156 are actualized in such a way that the CPU 101 in the controller 100 shown in FIG. 1 executes the system program read from the ROM 102 to primarily perform computation processing by the CPU 101 with the RAM 103 and the non-volatile memory 104 and input/output processing with the interfaces 108, 109. The display unit 154 is configured to obtain information on control from the control unit 152 and then display the information on the display device 120. Furthermore, the input unit 156 is configured to, in response to the operation made by the operator from the input device 121, output the operational information to the control unit 152.

The processing time managing unit 162 is actualized in such a way that the CPU 101 in the controller 100 shown in FIG. 1 executes the system program read from the ROM 102 to primarily perform computation processing by the CPU 101 with the RAM 103 and the non-volatile memory 104. The processing time managing device 162 is configured to manage time for processing pieces of data sent from the controller 100 on the display terminal 200. The processing time managing unit 162 receives time taken for processing the data sent from the controller 100 on the display terminal 200 via the data receiving unit 168. The processing time managing unit 162 then uses the time taken for processing each piece of received data to compute a data processing amount $Dpn_2$ of the data sent from the controller 100 per unit time on the display terminal 200. The processing time managing unit 162 outputs the computed amount of data processing $Dpn_2$ per unit time to the congestion control unit 164.

In addition to that, the processing time managing unit 162 measures processing time on the controller 100 with respect to each piece of data sent from the display terminal 200, and then sends the measured processing time via the congestion control unit 164 and the data sending unit 166 to the display terminal 200.

The congestion control unit 164 is actualized in such a way that the CPU 101 in the controller 100 shown in FIG. 1 executes the system program read from the ROM 102 to primarily perform computation processing by the CPU 101 with the RAM 103 and the non-volatile memory 104. The congestion control unit 164 is configured to send data via the data sending unit 166 to the display terminal 200 while controlling a data sending amount of data to be sent to the display terminal 200 per unit time. In response to, for example, a command from the control unit 152 or a data sending command from the display terminal 200, the congestion control unit 164 sends position information, load information and others of the servo motor 150 obtained by the control unit 152 to the display terminal 200. The congestion control unit 164 sets a data sending amount $Dsn_1$ per unit time for the display terminal 200 to a predefined value (which is relatively small value) in the early stage where the controller 100 starts up. Thus, the congestion control unit 164 sends data to be sent via the data sending unit 166 to the display terminal 200 within a range that does not exceed the data amount $Dsn_1$ per unit time.

The congestion control unit 164 controls the data sending amount per unit time for sending data to the display terminal 200 based on the data processing amount $Dpn_2$ per unit time processed by the display terminal 200 input by the processing time managing unit 162. The congestion control unit 164 compares, for example, the data sending amount $Dsn_1$ per unit time for currently sending pieces of data from the controller 100 to the display terminal 200 with the data processing amount $Dpn_2$ of the data processed per unit time by the display terminal 200.

In the case where the data processing amount $Dpn_2$ of the data processed per unit time by the display terminal 200 is greater than the data sending amount $Dsn_1$ per unit time for sending data from the controller 100 to the display terminal 200, the congestion control unit 164 increases the data sending amount $Dsn_1$ per unit time for sending data from the controller 100 to the display terminal 200. On the other hand, in the case where the data processing amount $Dpn_2$ of the data processed per unit time by the display terminal 200 is smaller than the data sending amount $Dsn_1$ per unit time for sending data from the controller 100 to the display terminal 200, the congestion control unit 164 decreases the data sending amount $Dsn_1$ per unit time for sending data from the controller 100 to the display terminal 200. The congestion control unit 164 may compare the amount $Dsn_1$ with the amount $Dpn_2$ by taking into account a predefined certain safety margin value.

The data sending unit 166 and the data receiving unit 168 are actualized in such a way that the CPU 101 in the controller 100 shown in FIG. 1 executes the system program read from the ROM 102 to primarily perform computation processing by the CPU 101 with the RAM 103 and the non-volatile memory 104 and input/output processing with an interface 111. The data sending unit 166 is configured to send pieces of data to the display terminal 200 in response to a command from the congestion control unit 164. The data receiving unit 168 is configured to provide pieces of data received from the display terminal 200 to the processing time managing unit 162.

The display terminal 200 that constitutes the control system 1 according to the embodiment includes a data processing unit 252, a display unit 254, an input unit 256, a processing time managing unit 262, a congestion control unit 264, a data sending unit 266 and a data receiving unit 268.

The data processing unit 252 is actualized in such a way that the CPU 201 in the display terminal 200 shown in FIG. 1 executes the system program read from the ROM 202 to primarily perform computation processing by the CPU 201 with the RAM 203 and the non-volatile memory 204. The data processing unit 252 is configured to perform information processing based on pieces of data sent from the controller 100. The data processing unit 252 may, for instance, produce data to be displayed for the display terminal 200 based on the data sent from the controller 100. The data processing unit 252 may, for example, perform statistical processing based on the data sent from the controller 100.

The display unit 254 and the input unit 256 are actualized in such a way that the CPU 201 in the display terminal 200 shown in FIG. 1 executes the system program read from the ROM 202 to primarily perform computation processing by the CPU 201 with the RAM 203 and the non-volatile memory 204 and input/output processing with the interfaces 208, 209. The display unit 254 is configured to display data processed by the data processing unit on the display device 120. The input unit 256 is configured to output information to the data processing unit 252 in response to an operation made by an operator from the input device 221.

The processing time managing unit 262 is actualized in such a way that the CPU 201 in the display terminal 200 shown in FIG. 1 executes the system program read from the ROM 202 to primarily perform computation processing by the CPU 201 with the RAM 203 and the non-volatile memory 204. The processing time management device 262 is configured to manage time for processing pieces of data sent from the display terminal 200 on the controller 100. The processing time managing unit 262 receives, via the data receiving unit 268, time taken for processing the data sent from the display terminal 200 on the controller 100. The processing time managing unit 262 then uses the time taken for processing each piece of received data to compute a data processing amount $Dpn_1$ of the data sent from the display terminal 200 per unit time on the controller 100. The processing time managing unit 262 outputs the computed amount of data processing $Dpn_1$ per unit time to the congestion control unit 264.

In addition to that, the processing time managing unit 262 measures processing time on the display terminal 200 concerning each piece of data sent from the controller 100, and then sends the measured processing time via the congestion control unit 264 and the data sending unit 266 to the controller 100.

The congestion control unit 264 is actualized in such a way that the CPU 201 in the display terminal 200 shown in FIG. 1 executes the system program read from the ROM 202 to primarily perform computation processing by the CPU 201 with the RAM 203 and the non-volatile memory 204. The congestion control unit 264 is configured to send data to the controller 100 via the data sending unit 266 while controlling a sending amount of pieces of data to be sent to the controller 100 per unit time. In response to a command from the data processing unit 252 or a data sending command from the controller 100, for example, the congestion control unit 264 sends such as the data sending command from the data processing unit 252 to the controller 100. The congestion control unit 264 sets a data sending amount $Dsn_2$ per unit time for the controller 100 to a predefined value (which is a relatively small value) in the early stage where the display terminal 200 starts up. Thus, the congestion control unit 264 sends data to be sent to the controller 100 through the data sending unit 266 within a range that does not exceed the data sending amount $Dsn_2$ per unit time.

The congestion control unit 264 controls the data sending amount per unit time for sending data to the controller 100 based on the data processing amount $Dpn_1$ per unit time on the controller 100 input by the processing time managing unit 262. The congestion control unit 264 compares, for example, the data sending amount $Dsn_2$ per unit time for pieces of data currently sent from the display terminal 200 to the controller 100 with the data processing amount $Dpn_1$ of the data processed by the controller 100 per unit time. In the case where the data processing amount $Dpn_1$ of the data processed by the controller 100 per unit time is greater than the data sending amount $Dsn_2$ per unit time for sending data from the display terminal 200 to the controller 100, the congestion control unit 264 increases the data sending amount $Dsn_2$ per unit time for sending data from the display terminal 200 to the controller 100. On the other hand, in the case where the data processing amount $Dpn_1$ of the data processed by the controller 100 per unit time is smaller than the data sending amount $Dsn_2$ per unit time for sending data from the display terminal 200 to the controller 100, the congestion control unit 264 decreases the data sending amount $Dsn_2$ per unit time for sending data from the display terminal 200 to the controller 100. The congestion control unit 264 may compare the amount $Dsn_2$ with the amount $Dpn_1$ by taking into account a predefined certain safety margin value.

The data sending unit 266 and the data receiving unit 268 are actualized in such a way that the CPU 201 in the display terminal 200 shown in FIG. 1 executes the system program read from the ROM 202 to primarily perform computation processing by the CPU 201 with the RAM 203 and the non-volatile memory 204 and input/output processing with the interface 211. The data sending unit 266 is configured to send pieces of data to the controller 100 in response to a command from the congestion control unit 264. Furthermore, the data receiving unit 268 is configured to provide the pieces of data received from the controller 100 to the processing time managing unit 262.

In the control system 1 with the above-described configuration, the data sending side takes into consideration the time of processing data on the data receiving side in the two-way communication, so as to be able to perform the congestion control suitable for the current data processing state. In particular, when the controller 100 sends pieces of data in succession to the display terminal 200 to display the data, there is less difference between the data currently obtained by the controller 100 and the data displayed on the display device 220 of the display terminal 200. Thus, the operator can safely carry out the operation.

Figure 3:
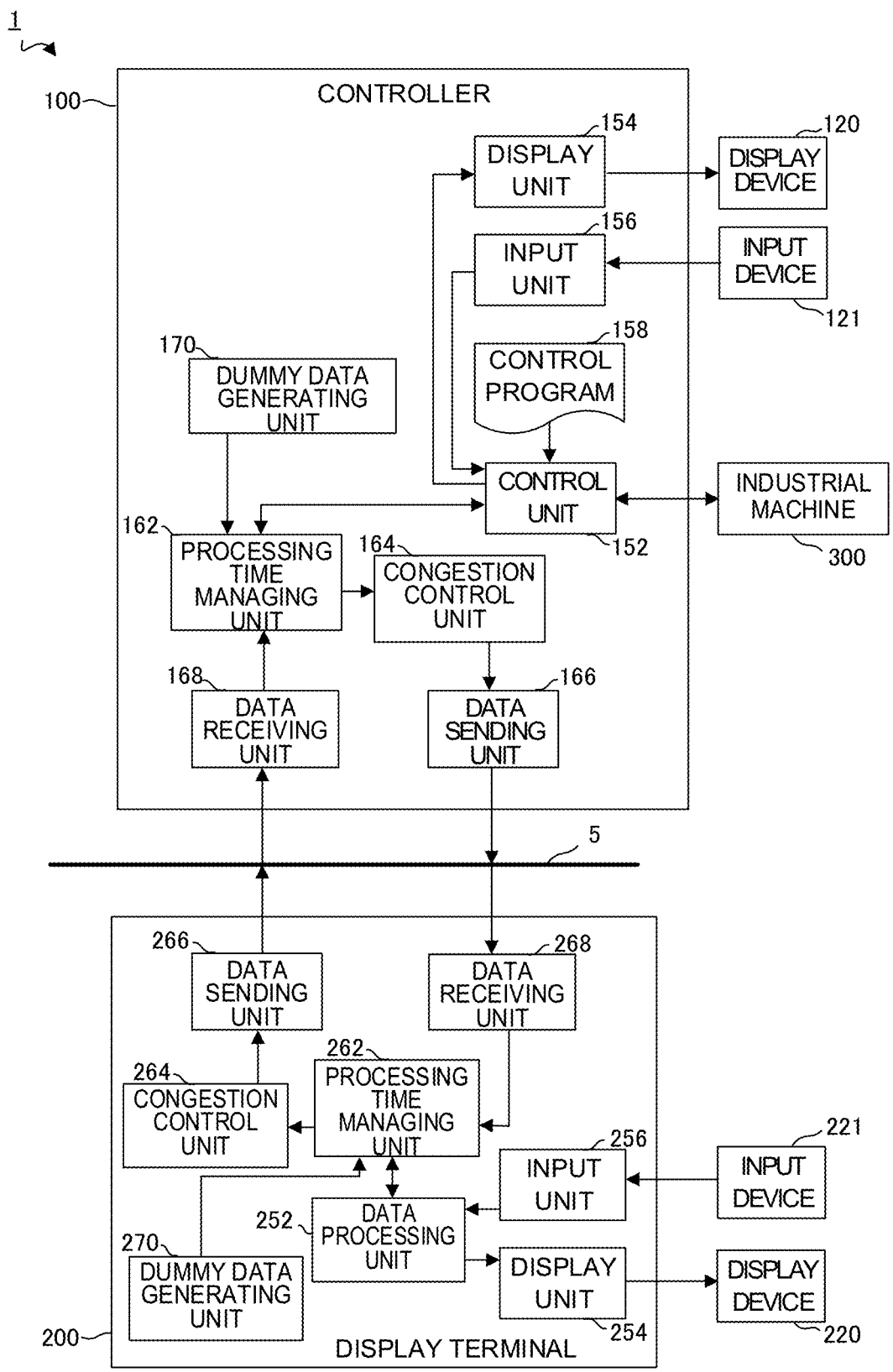
FIG. 3 is a schematic function block diagram showing a control system according to an alternative of the first embodiment.

As an alternative of the control system 1 according to the embodiment, when the data sending amount is small, the controller 100 and the display terminal 200 may include configurations for monitoring a data processing condition on the other end. For example, as shown in FIG. 3, the controller 100 and the display terminal 200 are provided with dummy data generating units 170 and 270, respectively. The dummy data generating units 170 and 270 are configured to periodically generate predetermined data, and give instructions to the processing time managing unit 162 to send the generated data to the other end. By providing such configuration, it is possible to monitor the data processing condition on the other end even when data are scarcely sent or received between the controller 100 and the display terminal 200, thereby setting the data sending amounts $Dsn_1$, $Dsn_2$ per unit time for sending the data depending on the data processing condition on the other end.

In the above-described alternative, for instance, if there is a situation in which the controller 100 is not being monitored by an operator, the above configurations have efficacy for the case where the operator is required to log in for monitoring the controller 100. In this controller 100, when the operator has not logged in, the controller 100 cannot send data obtained by the control unit 152 to the display terminal 200. Thus, the processing time managing units 162, 262 cannot appropriately manage the data processing condition on the ether end in such situation, and thereby the congestion control units 164, 264 cannot set appropriate data sending amounts $Dsn_1$, $Dsn_2$ per unit time. However, the dummy data generating units 170, 270 send out dummy data at predetermined timings and then receive times taken for processing the dummy data from the other ends, thereby maintaining appropriate data sending amounts $Dsn_1$, $Dsn_2$ at all times.

Figure 4:
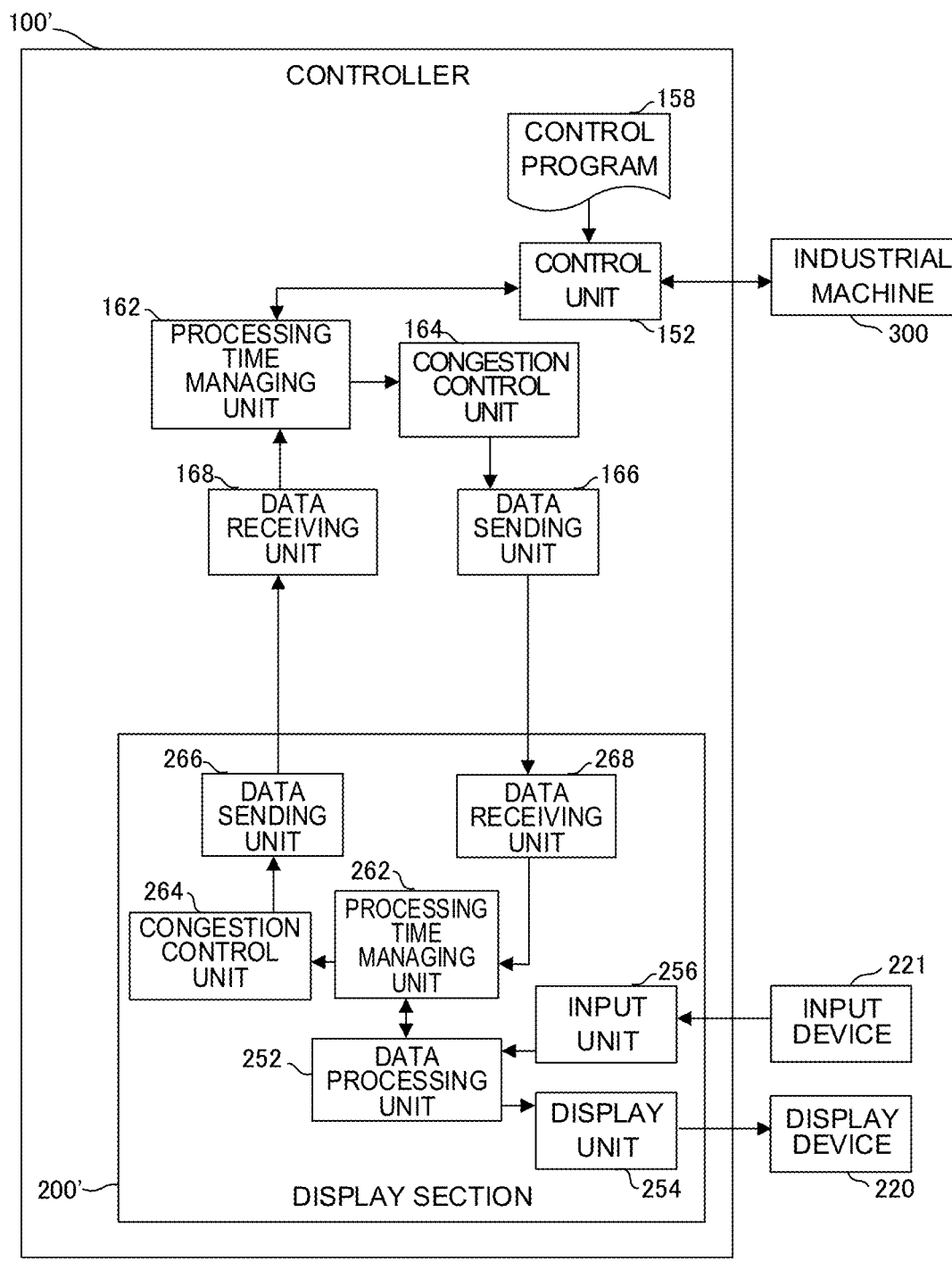
FIG. 4 is a schematic function block diagram showing a control system according to a second embodiment.

FIG. 4 shows functions of a controller 100' according to a second embodiment in a schematic block diagram. The controller 100' according to the embodiment is actualized by incorporating the display terminal 200 constituting the control system 1 of the first embodiment as a display section 200' into the controller 100. Each component of the controller 100' and the display section 200' exchange pieces of data via an interface, not shown, which is for performing predefined two-way communication. In this way, each function of the present invention works well even if the display section is integrated into the controller.

Whilst the embodiment of the present invention has been illustrated in the foregoing, the present invention is not limited to the above-described embodiments and may be implemented in various aspects with modifications made thereto as appropriate.

REFERENCE SIGNS LIST

1 Control System
5 Network
100 Controller
101 CPU
102 ROM
103 RAM
104 Non-volatile Memory
105, 108, 109, 111 Interface
106 PMC
107 I/O Unit
112 Bus
120 Display Device
121 Input Device
122 External Device
130 Shaft Control Circuit
140 Servo Amplifier
150 Servo Motor
152 Control Unit
154 Display Unit
156 Input Unit
158 Control Program
162 Processing Time Managing Unit
164 Congestion Control Unit
166 Data Sending Unit
168 Data Receiving Unit
170 Dummy Data Generating Unit
200 Display Terminal
201 CPU
202 ROM
203 RAM
204 Non-volatile Memory
208, 209, 211 Interface
212 Bus
220 Display Device
221 Input Device
252 Data Processing Unit
254 Display Unit
256 Input Unit
262 Processing Time Managing Unit
264 Congestion Control Unit
266 Data Sending Unit
268 Data Receiving Unit
270 Dummy Data Generating Unit
300 Industrial Machine

The invention claimed is:

1. A control system configured by two-way communication conducted between a controller and a display terminal for displaying an operating state of the controller, one of the controller and the display terminal defining one end of the two-way communication, and the other one of the controller and the display terminal defining the other end of the two-way communication, the control system comprising, at the one end, a hardware processor configured to:
    measure first time taken on the one end for processing pieces of first data received from the other end;
    obtain, from the other end, second time taken on the other end for processing pieces of second data sent to the other end;
    manage the second time taken on the other end for processing the pieces of second data;
    adjust a data sending amount to the other end per unit time based on the managed second time taken on the other end for processing the pieces of second data; and
    periodically generate predetermined dummy data, and send the generated predetermined dummy data to the other end.

2. The control system according to claim 1, wherein the hardware processor is configured to send the measured first time to the other end.

3. The control system according to claim 1, wherein the hardware processor is configured to compute a data processing amount of the pieces of second data per unit time on the other end by using the second time taken on the other end for processing the pieces of second data.

4. The control system according to claim 3, wherein the hardware processor is configured to adjust the data sending amount to the other end per unit time based on the data processing amount of the pieces of second data per unit time.

5. A controller for performing two-way communication with a display terminal, wherein the display terminal is configured to display an operating state of the controller, and wherein the controller comprises a hardware processor configured to:
- measure first time taken for processing pieces of first data received from the display terminal;
- obtain, from the display terminal, second time taken by the display terminal for processing pieces of second data sent to the display terminal;
- manage the second time taken by the display terminal for processing the pieces of second data;
- adjust a data sending amount to the display terminal per unit time based on the managed second time taken by the display terminal for processing the pieces of second data; and
- periodically generate predetermined dummy data, and send the generated predetermined dummy data to the display terminal.

6. The controller according to claim 5, wherein the hardware processor is configured to send the measured first time to the display terminal.

7. The controller according to claim 5, wherein the hardware processor is configured to compute a data processing amount of the pieces of second data per unit time on the display terminal by using the second time taken by the display terminal for processing the pieces of second data.

8. The controller according to claim 7, wherein the hardware processor is configured to adjust the data sending amount to the display terminal per unit time based on the data processing amount of the pieces of second data per unit time.

* * * * *